United States Patent [19]
Sobue

[11] Patent Number: 5,610,728
[45] Date of Patent: Mar. 11, 1997

[54] IMAGE RECORDING APPARATUS FOR RECORDING DIFFERENT SIZED IMAGES ON DIFFERENT SIZED RECORDING SHEETS

[75] Inventor: Ikuo Sobue, Kawasaki, Japan

[73] Assignee: Canon Kabushiki Kaisha, Tokyo, Japan

[21] Appl. No.: 94,919

[22] Filed: Jul. 22, 1993

Related U.S. Application Data

[63] Continuation of Ser. No. 629,573, Dec. 18, 1990, abandoned.

[30] Foreign Application Priority Data

Jan. 8, 1990 [JP] Japan .................................. 2-2342

[51] Int. Cl.$^6$ .................................................... H04N 1/40
[52] U.S. Cl. ........................ 358/449; 358/451; 358/434
[58] Field of Search ...................... 358/449, 451, 358/450, 296, 401, 444, 437, 404, 448; 379/100

[56] References Cited

U.S. PATENT DOCUMENTS

| | | | |
|---|---|---|---|
| 4,353,097 | 10/1982 | Takeda et al. | 358/451 |
| 4,506,302 | 3/1985 | Kurata | 358/449 |
| 4,580,171 | 4/1986 | Arimoto | 358/401 |
| 4,631,596 | 12/1986 | Yaguchi | 358/449 |
| 4,647,189 | 3/1987 | Fujiwara et al. | 355/55 |
| 4,679,093 | 7/1987 | Yaguchi | 358/449 |
| 4,712,139 | 12/1987 | Kato | 358/404 |
| 4,717,967 | 1/1988 | Yoshida | 358/296 |
| 4,731,658 | 3/1988 | Koseki | 358/451 |
| 4,814,893 | 3/1989 | Katoh | 358/296 |
| 4,882,630 | 11/1989 | Yamaguchi et al. | 358/451 |
| 4,933,771 | 6/1990 | Matsuura et al. | 358/451 |
| 4,956,723 | 9/1990 | Toda | 358/449 |
| 5,019,916 | 5/1991 | Ogura | 358/496 |
| 5,023,728 | 6/1991 | Nimura et al. | 358/453 |
| 5,053,885 | 10/1991 | Telle | 358/449 |
| 5,075,783 | 12/1991 | Yoshida et al. | 358/449 |
| 5,150,224 | 9/1992 | Mizude et al. | 358/451 |
| 5,223,939 | 6/1993 | Imaizumi et al. | 358/450 |

*Primary Examiner*—Kim Vu
*Assistant Examiner*—Fan Lee
*Attorney, Agent, or Firm*—Fitzpatrick, Cella, Harper & Scinto

[57] ABSTRACT

An image recording apparatus for recording images on a plurality of types of recording sheets having different sizes, includes a recording device for recording (i) in a first mode in which an image is recorded in a reduced form on a recording sheet of a first size, and (ii) in a second mode in which the image is recorded in a non-reduced form on a recording sheet of a second size, the second size being larger than the first size. A detecting device detects a size of the image to be recorded. A control device (i) compares the image size detected by the detecting device with a predetermined value, and (ii) enables the recording device to record (a) in the first mode when the image size detected by the detecting device is smaller than the predetermined value, and (b) in the second mode when the image size detected by the detecting device is larger than the predetermined value.

13 Claims, 5 Drawing Sheets

FIG. 5

| | TRANSMITTED ORIGINAL | RECEIVED AND RECORDED IMAGE |
|---|---|---|
| A | SHORTER THAN A4 | UNIT MAGNIFICATION IN A4 — $\ell_A$ |
| B | A4 SIZE | UNIT MAGNIFICATION IN A4 — $\ell_A$ |
| C | LONGER THAN A4 "CASE 1" | REDUCTION IN A4 — $\ell_B$ |
| D | LONGER THAN A4 "CASE 2" | UNIT MAGNIFICATION IN B4 — $\ell_C$ |
| E | LONGER THAN A4 "CASE 3" | DIVIDED WITH UNIT MAGNIFICATION IN A4 |

IMAGE RECORDING APPARATUS FOR RECORDING DIFFERENT SIZED IMAGES ON DIFFERENT SIZED RECORDING SHEETS

This application is a continuation of application Ser. No. 07/629,573 filed Dec. 18, 1990, now abandoned.

BACKGROUND OF THE INVENTION

1. Field of the Invention

This invention relates to an image communication apparatus, and more particularly, to an image communication apparatus capable of recording a received image on a plurality of sizes of recording paper.

2. Description of the Related Art

Heretofore, for example, in a facsimile apparatus, a plurality of cassettes for various kinds of recording paper having standard sizes have been used. Upon reception, one kind of recording paper has been selected in accordance with a size transmitted from the transmission side, and recording has been performed on the selected paper. The transmitted size is determined by the main scanning size of a transmitted original.

For example, in a facsimile having two-stage cassettes for the A4 and B4 sizes, if the transmitted original has the A4 size, recording is performed on A4 recording paper, and if the transmitted original has the B4 size, recording is performed on B4 recording paper.

If the transmitted original is longer than the A4 size, and the receiving apparatus cannot record on paper longer than A4 size, recording is performed on the A4 recording paper by dividing the original into two or more pages upon receipt.

In North American countries, various kinds of recording paper in which only subscanning lengths are different from one another, such as letter size paper, legal size paper, etc. are used. In the case of using such recording paper, the legal size paper is selected when the length of the image of an original has exceeded the length of the letter size paper, and recording is performed on the legal size paper.

In the above-described A4/B4 apparatus, the image of an original which can be recorded on B4 recording paper without being divided is recorded on A4 recording paper by being divided. Hence, sheets of recording paper are uselessly wasted.

Apparatuses or methods for recording a long original on cut sheets by dividing the image of the original are disclosed in U.S. Pat. Nos. 4,712,139, 4,679,093, 4,717,967 and 4,631,596.

However, an apparatus or method which solves the above-described problems have not yet been proposed.

SUMMARY OF THE INVENTION

It is an object of the present invention to improve an image communication apparatus or a image recording apparatus, in consideration of the above-described problems.

It is a further object of the present invention to provide an image communication apparatus capable of efficiently performing an image recording operation when an image is recorded on one or more cut sheets.

It is a still further object of the present invention to prevent waste of recording paper when an image of an original longer than a defined length is recorded.

It is still another object of the present invention to provide an image communication apparatus for recording an image on at least one of plural cut sheets having a plurality of sizes, the apparatus detecting the length of the image of a received original, selecting recording paper having a proper size in accordance with the detected length of the image of the original, and recording the image on the selected recording paper, wherein the image is recorded by dividing the image in accordance with the result of detection.

It is still a further object of the present invention to provide an image communication apparatus which detects the length of a received image, selects recording paper in accordance with the detected length, and records the image on the selected recording paper with unit magnification or varying magnification in accordance with the detected length.

It is yet another object of the present invention to provide an image communication apparatus having a plurality of storage means for storing cut sheets of different sizes. A reception means receives image data that is later to be recorded on at least one cut sheet supplied from the storage means. Control means detects the length of the received image and selects a cut sheet from one of the storage means, the sheet having a paper size corresponding to the length of the image detected. However, the control means records the received image on a plurality of selected cut sheets by dividing the image when the length of the received image is larger than the length of the largest size recording paper being stored in the storage means.

These and other object of the present invention will become apparent from the following detailed description of the preferred embodiment taken in connection with the accompanying drawings.

BRIEF DESCRIPTION OF THE DRAWINGS

FIG. 5 is a diagram wherein transmitted originals correspond to respective received and recorded images.

DETAILED DESCRIPTION OF THE PREFERRED EMBODIMENT

The preferred embodiment of the present invention will now be explained in detail with reference to the drawings.

Although an explanation will be provided of a facsimile device as an image communication apparatus in the following embodiment, the present invention is not limited to the facsimile machine, but may be applied to any image communication apparatus for generally performing the communication of an image using code information.

Figure 1:
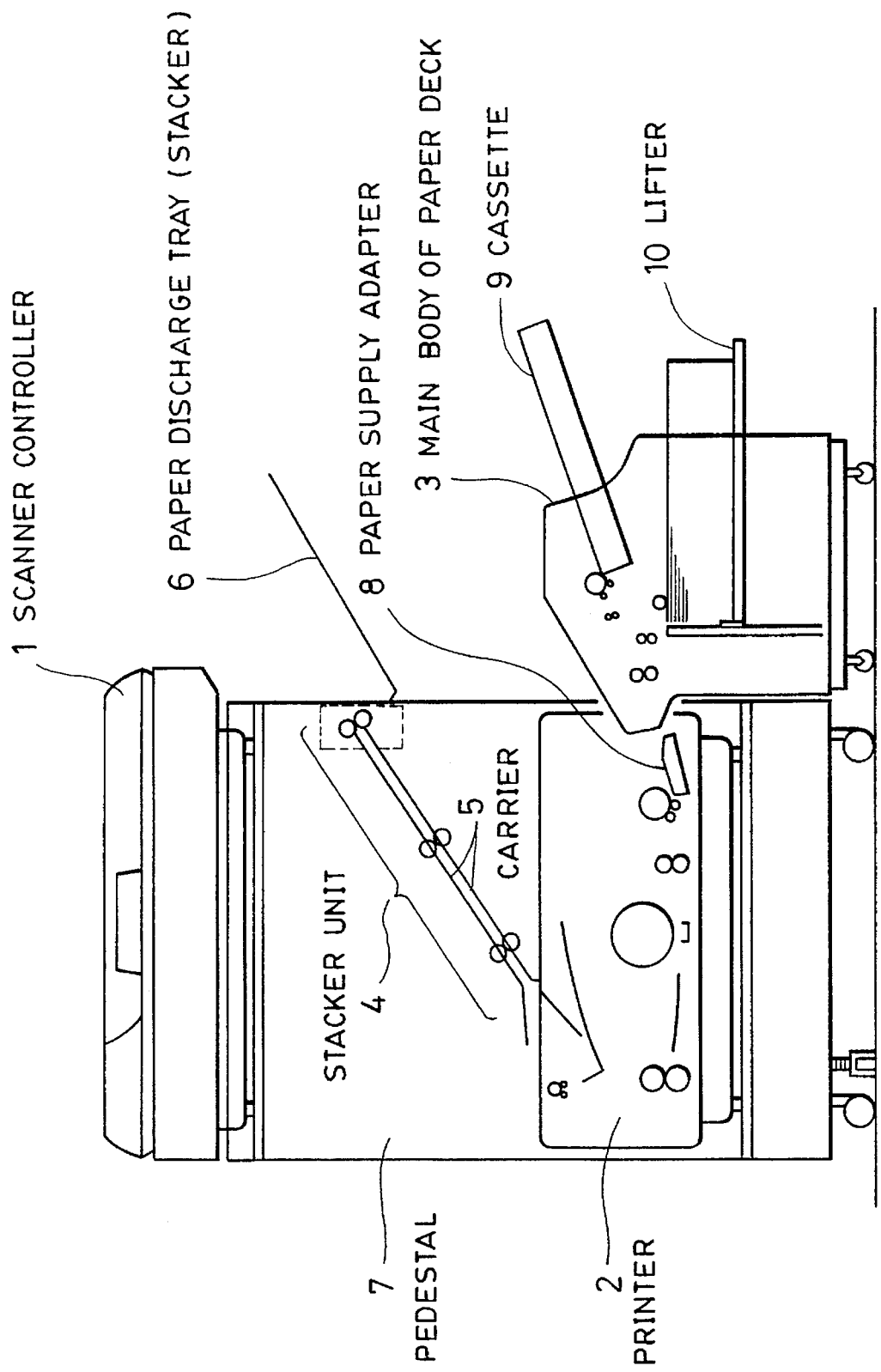
FIG. 1 is a schematic diagram of the system configuration of a facsimile according to an embodiment of the present invention.

FIG. 1 is a diagram showing the schematic configuration of a facsimile device according to the present embodiment. In FIG. 1, a scanner controller 1 controls reading, transmission and reception. There are also shown a printer 2 for recording, a paper deck 3, a stacker unit 4, a carrier 5 for carrying a sheet of recording paper, a paper discharge tray 6, a pedestal 7, a paper supply adapter 8, a cassette 9, and a lifter 10 for mounting a large amount of recording paper. Cassette 9 may be an A5, B5 or A4 cassette. B5, A4 or B4-sized paper may be mounted on the lifter 10.

Figure 2:
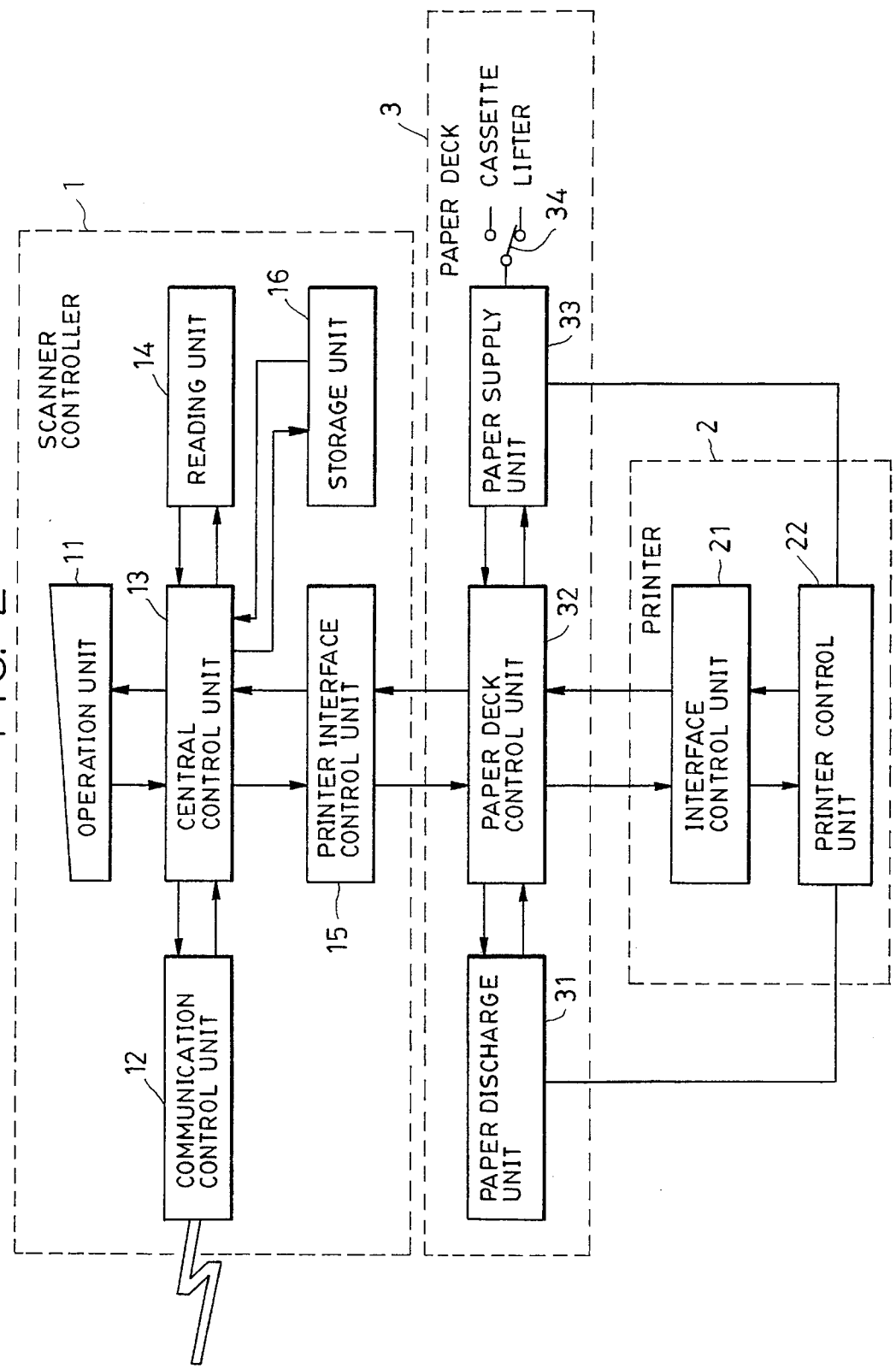
FIG. 2 is a block diagram of the configuration of a principal part of the facsimile shown in FIG. 1.

FIG. 2 is a block diagram showing the configuration of the embodiment of FIG. 1. In FIG. 2, components indicated by the same numerals as those in FIG. 1 are identical to those explained in FIG. 1. In FIG. 2, the internal configurations of the scanner controller 1, the paper deck 3 and the printer 2 shown in FIG. 1 are shown.

In FIG. 2, an operation unit 11 comprises a plurality of key input switches, scanning circuitry for key inputs, display units for displaying various kinds of information and status of the apparatus, and the like.

A communication control unit 12 controls facsimile communication (for example, the facsimile communication for the G3 and G4 standards recommended by the CCITT)

A central control unit 13 controls the entire apparatus and comprises a microcomputer, a read-only memory (ROM) storing control programs for the microcomputer, a random access memory (RAM) for temporarily storing various kinds of data, and the like. Encoding and decoding processing for image data is performed by the central control unit 13 in the present embodiment.

A reading unit 14 reads an original.

A printer interface control unit 15 controls the paper deck 3 and the printer 2.

A storage unit 16 stores image data.

The scanner controller 1 is configured by the above-described operation unit 11, the communication control unit 12, the central control unit 13, the reading unit 14, the printer interface control unit 15 and the storage unit 16.

An interface control unit 21 at the printer side performs input/output of control signals relative to the central control unit 13.

A printer control unit 22 for controlling the printer 2 comprises a microcomputer, a ROM, a RAM and the like.

The controller for the printer 2 is configured by the above-described interface control unit 21 and the printer control unit 22.

A paper discharge unit 31 controls the stacker unit 4.

A paper deck control unit 32 for controlling the paper deck 3 comprises a microcomputer, a ROM, a RAM and the like.

A paper supply unit 33 supplies recording paper from the cassette 9 or the lifter 10.

The controller for the paper deck 3 is configured by the above-described paper discharge unit 31, the paper deck control unit 32 and the paper supply unit 33.

The facsimile of the present embodiment is configured as described above.

An outline of the operation of the facsimile of the present embodiment will now be explained.

The operation unit 11 first performs a copying or transmission operation, and image data of an original read by the reading unit 4 is first stored in the storage unit 16 via the central control unit 13. If the read image data in the storage unit 16 is to be transmitted, that data is output to a communication network via the central control unit 13 and the communication control unit 12. If the image data will be used for a copying operation, control signals and the image data are output to the paper deck 3 via the central control unit 13 and the printer interface control unit 15.

The control signals and the image data transmitted from the printer interface control unit 15 are temporarily received in the paper deck control unit 32. While driving the paper supply unit 33 and the paper discharge unit 31 in accordance with the contents of each of the received control signals and input determination of detection signals from various kinds of sensors, the paper deck control unit 32 transmits the image data and the control signals to the interface control unit 21 of the printer 2.

Similarly, the received image data is output to the paper deck 3 via the communication control unit 12, the central control unit 13 and the printer interface control unit 15. Subsequently, recording of the received image is performed by the printer 2.

The paper deck control unit 32 receives input, various kinds of status signals of the printer 2 through the interface control unit 21 of the printer 2, supplies status signals from the paper discharge unit 31 and the paper supply unit 33 to the printer 2, and transmits various kinds of the resultant status signals to the printer interface control unit 15 of the scanner controller 1.

The paper supply unit 33 of the paper deck 3 includes a switching unit 34 for switching between either the recording paper in the cassette 9 or the recording paper on the lifter 10 in accordance with the control signals from the scanner controller 1.

Figure 3:
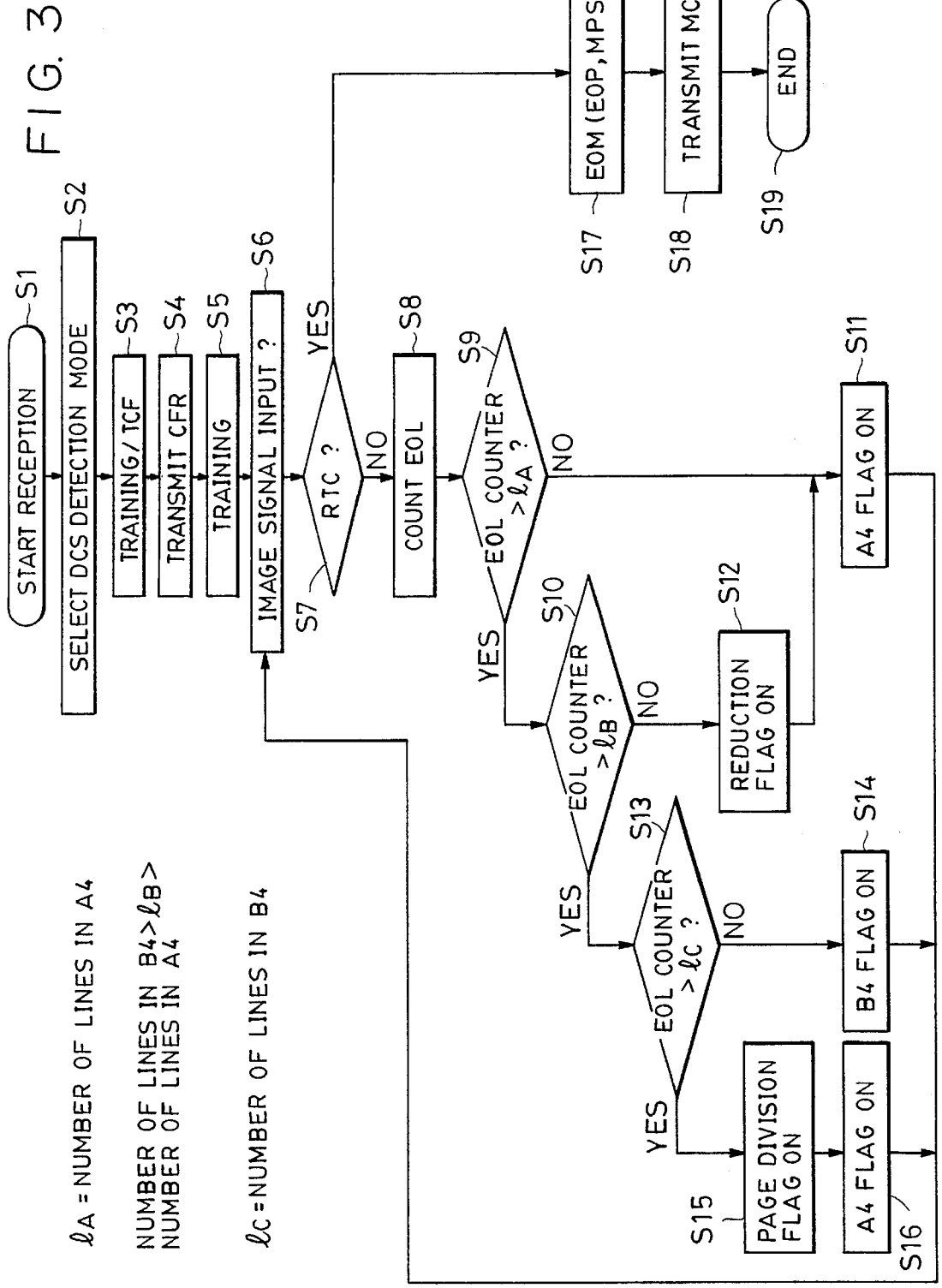
FIG. 3 is a flowchart showing a control operation for the facsimile of the embodiment during reception.

FIG. 3 is a flowchart showing a control operation by the central control unit 13 in the above-described configuration during reception by the facsimile device. The flowchart shows only an example, and various modifications may be made. The flowchart shown in FIG. 3 assumes a case in which A4 recording paper is set on the lifter 10 and B4 recording paper is set in the cassette 9.

First, at step S1, when a calling signal from the network has been detected by the communication control unit 12, reception control starts. At step S2, after transmitting a procedure signal indicating the function of the apparatus (for example, a digital identification signal DIS in the case of the G3 standard), a procedure signal for setting a communication mode from the correspondent (a digital command signal DCS in the case of the G3 standard) is received, and the assigned communication mode is set. At this time, since the main scanning length of the transmitted image is indicated by the DCS, the reception side detects the main scanning length according to the size information included in the signal DCS.

Subsequently, at step S3, training for testing if image communication in the set communication mode is possible and the sequence of a TCF (training check function) is executed. In step 54, if image communication in the set communication mode is possible, a procedure signal indicating the preparation of reception (a reception confirming signal CFR in the case of the G3 standard) is transmitted. After the reception of the training at step S5, the reception of an image signal is performed beginning at step S6. When the main scanning length of the received image corresponds to the B4 size paper, the B4 recording paper is selected. When the image signal for one line has been received and decoded at step S6, the presence of the reception of a signal for switching from the image signal from the correspondent to the reception of the procedure signal (a signal RTC in the case of the G3 standard) is determined at step S7. If the signal RTC is not received, signals EOL indicating the count value of the number of the received lines are counted at step S8. At steps S9, S10 and S13, the count value by an EOL counter is compared with the number $l_A$ of lines in an A4-sized image, the number $l_B$ of lines such that the relationship the number of lines in a B4-sized image $>l_B>$ the number of lines in an A4-sized image is obtained, and the number $l_C$ of lines in a B4-sized image, respectively. The values $l_A$, $l_B$ and $l_C$ change in accordance with the line density of an image signal. If it has been determined that the count value by the EOL counter is not larger than $l_A$ at step S9, an A4 flag is set at step S11. If it has been determined that the count value by the EOL counter is larger than $l_A$ then the operation proceeds to step 10 where it is determined if the EOL counter count value is larger than $l_B$, and, if not, a reduction flag is set at step S12, and the process proceeds to step S11. If it has been determined that the count value by the EOL counter is equal to or smaller than $l_C$ at step S13, a B4 flag is set at step S14 (at this time, the A4 flag set at step S11 is reset). If it has been determined that the count value by the EOL counter is larger than $l_C$ at step S13, a page division flag is set at step S15, and an A4 flag is set at step S16 (at this time, the B4 flag is reset). Thus, an image for one page is received.

The determination of the reception of the signal RTC at step S7 indicates the end of the reception for one page. A procedure signal (any one of a multipage signal MPS, an end-of-message signal EOM and an end-of-procedure signal EOP in the case of the G3 standard) from the correspondent is then received at step S17. If the procedure signal has been received and errors in the image are within a permissible range, a procedure signal indicating the reception of the image (a message confirming signal MCF in the case of the G3 standard) is transmitted at step S18. At this time, the process returns to step S2 when the signal EOM has been received, the process returns to step S5 when the signal MPS has been received, and the process proceeds to step S19 when the signal EOP has been received, where the reception is ended.

In the present embodiment, when an image for one page has been stored in the storage unit 16, or when a page division flag has been set, the recording of the image of the page is started.

Alternatively, the recording of images may be started when received images for all pages have been stored in the storage unit 16. In this case, however, each flag information is made to correspond to each page, and the information is stored.

Figure 4:
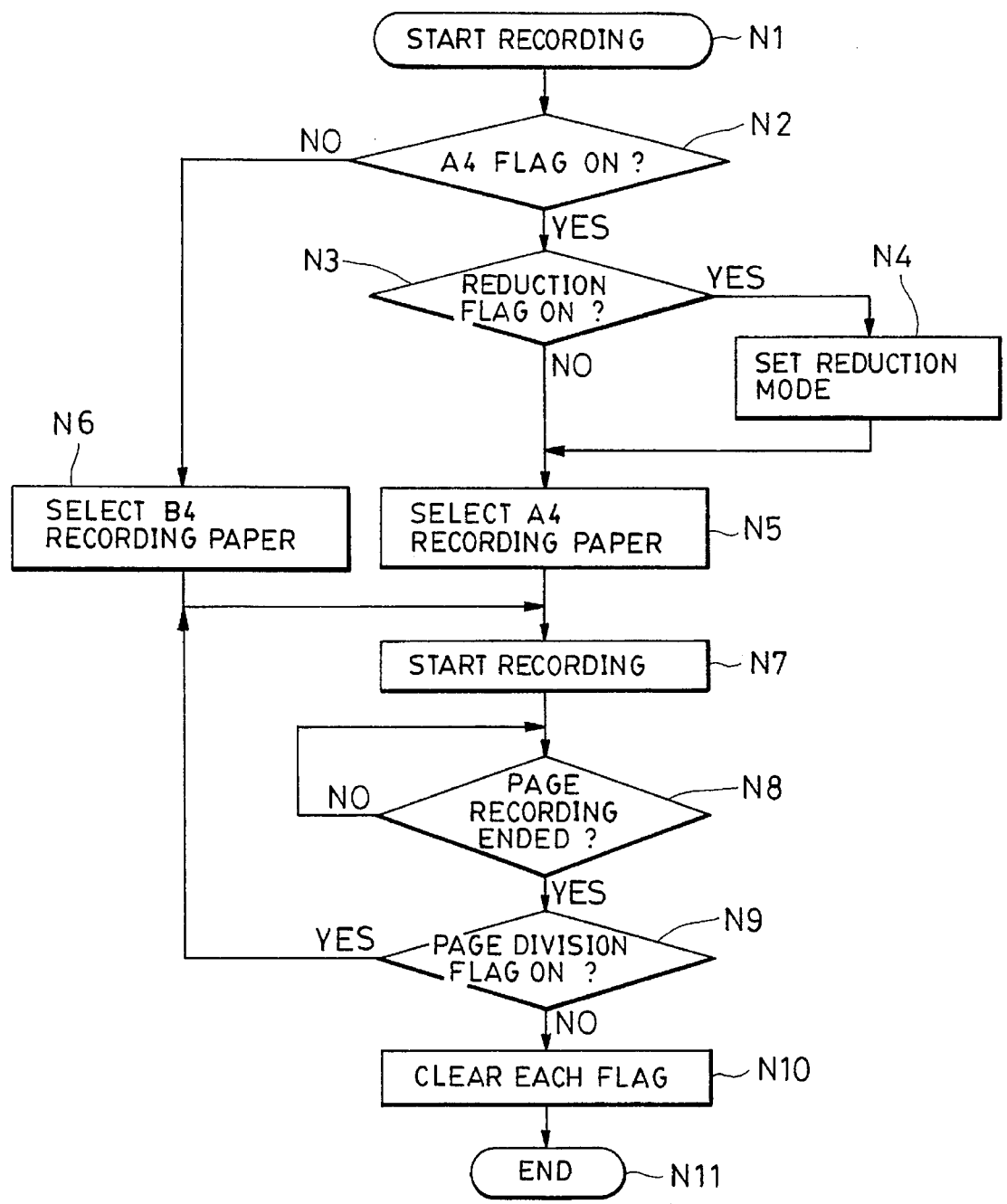
FIG. 4 is a flowchart showing a control operation for the facsimile of the embodiment during recording.

FIG. 4 is a flowchart showing a control operation of the central control unit 13 when an image is recorded.

First recording control is started at step N1. At step N2, it is determined whether an A4 flag is set or a B4 flag is set for an image to be recorded at step N2. If an A4 flag has been set, the operation proceeds to step N3 where it is determined whether or not a reduction flag is set. If a reduction flag has been set at step N3, a reduction mode is set at step N4, and the process proceeds to step N5. If a reduction flag has not been set, the process immediately proceeds from step N3 to step N5. At step N5, a control signal for selecting the A4-sized recording paper is output to the paper deck control unit 32 via the printer interface control unit 15 in order to select the A4-sized recording paper (the selection of the lifter 10 in the present embodiment). The switching unit 34 of the paper deck 3 is switched in accordance with the A4 selection control signal.

On the other hand, if it has been determined that a B4 flag is set at step N2, a B4 selection control signal for selecting the B4-sized recording paper is transmitted to the paper deck control unit 32 at step N6 to select the B4 recording paper (the selection of the cassette 9 in the present embodiment).

Subsequently, at step NT, a control signal to start recording is output to the printer 2 via the paper deck control unit 32, image information is transmitted, and the recording of the image is started. At step N8, a check is made for the presence of an end-of-recording signal from the printer 2. If an end-of-recording signal has been received, it is determined that recording for one page has been ended, and the process proceeds to step N9. If the determination of the setting of a page division flag has been performed and the page division flag has been set at step N9, the process returns to step N7, where after supplying the subsequent sheet of the A4 recording paper, the image information is transmitted to the printer 2, and recording of the image is performed.

If a page division flag is not set at step N9, the process proceeds to step N10, where each flag is cleared.

FIG. 5 is a diagram showing the relationship between transmitted originals and received and recorded images.

"A" represents the case wherein an original is shorter than the number $l_A$ of lines in the A4 size, An image is recorded with unit magnification on A4 recording paper.

"B" represents the case wherein an original has the same length as the number $l_A$ of lines in the A4 size. An image is recorded with unit magnification on A4 recording paper, "C" represents the case wherein an original is longer than the number $l_A$ of lines in the A4 size and shorter than the number $l_B$ of lines, A reduced image is recorded on A4 recording paper. When $l_B=1.1\times l_A$, the reduction ratio is about 90%.

"D" represents the case wherein an original is longer than $l_B$ and shorter than the number $l_C$ of lines in the B4 size. An image is recorded with unit magnification on B4 recording paper.

"E" represents the case wherein an original is longer than the number $l_C$ of lines in the B4 size and corresponds to 2 $l_A$. Images are recorded with unit magnification divided on two sheets of A4 recording paper.

According to the above-described embodiment, when receiving and recording an original shorter than a standard size or a long original exceeding a standard size, blank space in sheets of recording paper having a standard size can be reduced to as small an area as possible, the disadvantages in page division recording caused by using cut paper are thereby minimized, and the loss of image data is prevented. As a result, advantages in a recording operation using cut paper can be fully utilized.

When the recording paper is letter size paper or legal size paper, the number $l_A$ of lines may be set to the number of lines in the letter size paper, and the number lmay be set to the number of lines in the legal size paper.

Besides the case of the two-stage paper supply, in the case of multi-stage paper supply (three stages or more) for the A4, lateral B5, B4 sizes and the like, the number of lines corresponding to respective paper sizes are compared with the number of lines of an original, and recording is performed with varying magnifications or divided images, as in the above-described embodiment. If the main scanning length of a received image corresponds to recording paper having the largest size, the largest recording paper is selected when the main scanning length has been recognized by the signal DCS. It is thereby possible to efficiently record the image of an original.

Except as otherwise disclosed herein, the various components shown in outline or in block form in FIGS. 1 and 2 are individually well known and their internal construction and operation are not critical either to the making or using of this invention or to a description of the best mode of the invention.

The present invention is not limited to the above-described embodiment, but various changes and modifications may be made within the spirit and scope of the invention.

What is claimed is:

1. An image recording apparatus for recording images on a plurality of types of recording sheets having different sizes, said image recording apparatus comprising:

receiving means for receiving an image;

storing means for storing the received image;

recording means for recording (i) in a first mode in which the received image is recorded in a reduced form on a recording sheet of a first size, and (ii) in a second mode in which the received image is recorded in a form which is reduced less than the reduced form of the first mode on a recording sheet of a second size, the second size being larger than the first size;

detecting means for detecting a size of the received image to be recorded; and control means (i) for comparing the image size detected by said detecting means with a predetermined value, and (ii) for enabling said recording means to record after receiving one page of the received image (a) in the first mode when the image size detected by said detecting means is smaller than the predetermined value, and (b) in the second mode when the image size detected by said detecting means is larger than the predetermined value.

2. An image recording apparatus according to claim 1, wherein said recording means further records in a third mode in which the image is recorded in a non-reduced form on a recording sheet of the first size.

3. An image recording apparatus according to claim 1, wherein said detecting means includes counting means for counting a number of lines forming the image to be recorded to detect the size of the image.

4. An image recording apparatus according to claim 1, wherein the predetermined value corresponds to a size which is greater than the first size.

5. An image recording apparatus, comprising:

receiving means for receiving an image;

storing means for storing the received image;

recording means for selectively recording the received image on a sheet having one of a first sheet size and a second sheet size larger than the first sheet size;

detection means for detecting a size of the received image;

comparison means for comparing the detected size to a first predetermined value corresponding to the first sheet size and a second predetermined value corresponding to the second sheet size; and control means for controlling said recording means to record the stored image after receiving one page of the received image (i) on a sheet having the second sheet size, when the detected size is greater than the first predetermined value and less than or equal to the second predetermined value and (ii) on a plurality of sheets having the first sheet size, when the detected size is greater than the second predetermined value.

6. An image recording apparatus, comprising:

receiving means for receiving an image;

storing means for storing the received image;

recording means for recording the received image on a sheet having one of a first sheet size and a second sheet size larger than the first sheet size;

detection means for detecting a size of the received image;

comparison means for comparing the detected size to a first predetermined value corresponding to a first sheet size and a second predetermined value corresponding to a second sheet size; and control means for controlling said recording means to record the stored image after receiving one page of the received image data (i) on a sheet having the first sheet size, when the detected size is less than or equal to the first predetermined value, (ii) on a sheet having the second sheet size, when the detected size is greater than the first predetermined value and less than or equal to the second predetermined value, and (iii) on a plurality of sheets having the first sheet size, when the detected size is greater than the second predetermined value.

7. An apparatus according to claim 6, wherein said comparison means comprises means for comparing the detected size to the first sheet size, and said control means controls said recording means to record the received image in a reduced form on a sheet having the first sheet size, when the detected size is greater than the first sheet size and less than or equal to the first predetermined value.

8. A method for recording images on a plurality of types of recording sheets having different sizes, said image recording method comprising:

receiving an image to be recorded;

storing the received image;

detecting a size of the received image to be recorded;

comparing the detected size of the received image with a predetermined value; and after receiving one page of the received image, recording (a) in a reduced form on a recording sheet of a first size when the detected image size is smaller than the predetermined value, and (b) in a form which is reduced less than the reduced form of the first mode on a recording sheet of a second size which is larger than the first size when the detected image size is larger than the predetermined value.

9. A recording method according to claim 8, wherein the size of the image to be recorded is detected by counting a number of lines forming the image.

10. A recording method according to claim 8, wherein the predetermined value corresponds to a size which is greater than the first size.

11. A method of recording images, comprising:

receiving an image to be recorded;

storing the received image;

detecting a size of the received image;

comparing the detected size of the received image to a first predetermined value corresponding to a first sheet size and a second predetermined value corresponding to a second sheet size; and recording the stored image after receiving one page of the image (i) on a sheet having the second sheet size, when the detected size is greater than the first predetermined value and less than or equal to the second predetermined value and (ii) on a plurality of sheets having the first sheet size, when the detected size is greater than the second predetermined value.

12. A method of recording images, comprising:

receiving an image to be recorded;

storing the received image;

detecting a size of the received image;

comparing the detected size of the received image to a first predetermined value corresponding to a first sheet size and a second predetermined value corresponding to a second size sheet size; and recording the stored image after receiving one page of image (i) on a sheet having the first sheet size, when the detected size is less than or equal to the first predetermined value, (ii) on a sheet having the second sheet size, when the detected size is greater than the first predetermined value and less than or equal to the second predetermined value, and (iii) on a plurality of sheets having the first sheet size, when the detected size is greater than the second predetermined value.

13. An apparatus according to claim 12, wherein the detected size is compared to the first sheet size, and the received image is recorded in a reduced form on a sheet having the first sheet size, when the detected size is greater than the first sheet size and less than or equal to the first predetermined value.

* * * * *

UNITED STATES PATENT AND TRADEMARK OFFICE
CERTIFICATE OF CORRECTION

PATENT NO. : 5,610,728
DATED : March 11, 1997
INVENTOR(S) : Ikuo SOBUE

Page 1 of 2

It is certified that error appears in the above-indentified patent and that said Letters Patent is hereby corrected as shown below:

COLUMN 1
Line 58, "a" should read --an--.

COLUMN 2
Line 30, "object" should read --objects--.

COLUMN 4
Line 13, after "receives", insert --as--.

COLUMN 5
Line 48, "nota" should read --not a--;
Line 66, "NT" should read --N7,--.

COLUMN 6
Line 47, "lmay" should read --$1_c$ may--.

UNITED STATES PATENT AND TRADEMARK OFFICE
CERTIFICATE OF CORRECTION

PATENT NO. : 5,610,728
DATED : March 11, 1997
INVENTOR(S) : Ikuo SOBUE

It is certified that error appears in the above-indentified patent and that said Letters Patent is hereby corrected as shown below:

COLUMN 9
Line 4, delete "size", first occurrence.

Signed and Sealed this

Nineteenth Day of August, 1997

*Attest:*

BRUCE LEHMAN

*Attesting Officer*     *Commissioner of Patents and Trademarks*